US010669049B2

(12) United States Patent
Eberhardt et al.

(10) Patent No.: US 10,669,049 B2
(45) Date of Patent: Jun. 2, 2020

(54) DEVICE FOR FILLING A RECEPTACLE

(71) Applicant: Robert Bosch GmbH, Stuttgart (DE)

(72) Inventors: Albert Eberhardt, Ishofen (DE);
Andreas Rappold, Satteldorf (DE);
Dieter Bandtel, Buehlerzell (DE);
Joachim Frangen, Heilbronn (DE);
Jochen Ziegler, Satteldorf (DE);
Jochen Peters, Crailsheim (DE);
Markus Hanisch, Markgroeningen
(DE); Oliver Ullmann, Satteldorf (DE);
Sebastian Gran, Frankfurt am Main
(DE); Stefan Junker, Leonberg (DE);
Stefan Pfeiffer, Bamberg (DE); **Ulrich
Krauss, Ilshofen (DE); Werner Arleth**,
Esslingen (DE); Werner Runft,
Winnenden (DE); **Joshua
Windsheimer**, Satteldorf (DE)

(73) Assignee: Robert Bosch GmbH, Stuttgart (DE)

( * ) Notice: Subject to any disclaimer, the term of this patent is extended or adjusted under 35 U.S.C. 154(b) by 399 days.

(21) Appl. No.: 15/329,215

(22) PCT Filed: Jun. 15, 2015

(86) PCT No.: PCT/EP2015/063301
§ 371 (c)(1),
(2) Date: Jan. 25, 2017

(87) PCT Pub. No.: WO2016/012157
PCT Pub. Date: Jan. 28, 2016

(65) Prior Publication Data
US 2018/0229866 A1    Aug. 16, 2018

(30) Foreign Application Priority Data

Jul. 25, 2014    (DE) ........................ 10 2014 214 697

(51) Int. Cl.
*B65B 3/00*    (2006.01)
*B65B 39/12*    (2006.01)
(Continued)

(52) U.S. Cl.
CPC ................ *B65B 3/003* (2013.01); *B65B 3/28*
(2013.01); *B65B 7/2821* (2013.01); *B65B
39/12* (2013.01);
(Continued)

(58) Field of Classification Search
CPC .......... B65B 3/003; B65B 39/12; B65B 3/28;
B65B 65/003; B65B 43/59; B65B 7/2821;
(Continued)

(56) References Cited

U.S. PATENT DOCUMENTS 9,878,813 B2 *    1/2018  Eberhardt ............... B65B 39/12
10,239,742 B2 *   3/2019  Dresser ................... A47F 1/085
(Continued)

FOREIGN PATENT DOCUMENTS

CN    101306726 A    11/2008
CN    103043447 A    4/2013
(Continued)

OTHER PUBLICATIONS

International Search Report for Application No. PCT/EP2015/063301 dated Aug. 14, 2015 (English Translation, 3 pages).
(Continued)

*Primary Examiner* — Timothy P. Kelly
(74) *Attorney, Agent, or Firm* — Michael Best & Friedrich LLP

(57) ABSTRACT

Disclosed is a device for filling a receptacle, comprising at least one filling station (48) for filling at least one receptacle (36), and at least one receptacle holder (38) for conveying the receptacle (36) relative to the filling station (48), characterized in that at least one driving surface (13) and at least (Continued)

one mover (20) which can be coupled to the driving surface (13) especially in a magnetic manner are provided, the mover (20) being arranged so as to be movable and/or rotatable on the driving surface (13) in at least two degrees of freedom, and in that the receptacle holder (38) is disposed on the mover (20).

14 Claims, 7 Drawing Sheets

(51) Int. Cl.
  *B65B 43/59* (2006.01)
  *B65B 65/00* (2006.01)
  *B65B 3/28* (2006.01)
  *B65G 54/02* (2006.01)
  *B65B 7/28* (2006.01)

(52) U.S. Cl.
  CPC ............ *B65B 43/59* (2013.01); *B65B 65/003* (2013.01); *B65G 54/02* (2013.01); *B65B 7/2857* (2013.01); *B65B 2210/02* (2013.01); *B65G 2201/0235* (2013.01)

(58) Field of Classification Search
  CPC ... B65B 2210/02; B65B 7/2857; B65G 54/02; B65G 2201/0235
  See application file for complete search history.

(56) References Cited

U.S. PATENT DOCUMENTS

| | | | | |
|---|---|---|---|---|
| 2013/0034410 | A1* | 2/2013 | Heise ................ | B65G 54/02 |
| | | | | 414/222.13 |
| 2017/0225814 | A1* | 8/2017 | Eberhardt ............ | B65B 39/12 |
| 2017/0225911 | A1* | 8/2017 | Baechle ............... | B65G 54/02 |

FOREIGN PATENT DOCUMENTS

| | | |
|---|---|---|
| CN | 203306365 U | 11/2013 |
| DE | 102010043160 | 5/2012 |
| DE | 102011085724 A1 | 5/2013 |
| EP | 0601213 | 6/1994 |
| EP | 2420450 | 2/2012 |
| EP | 2570350 | 3/2013 |
| EP | 2589966 | 5/2013 |
| WO | 2011138448 | 11/2011 |
| WO | 2013098202 A1 | 7/2013 |
| WO | 2014063930 | 5/2014 |

OTHER PUBLICATIONS

"X/Y Positioning Systems based on Planar Motor Technology", INA Drives & Mechatronics GmbH & Co., Jan. 2014, Suhl, Germany.

* cited by examiner

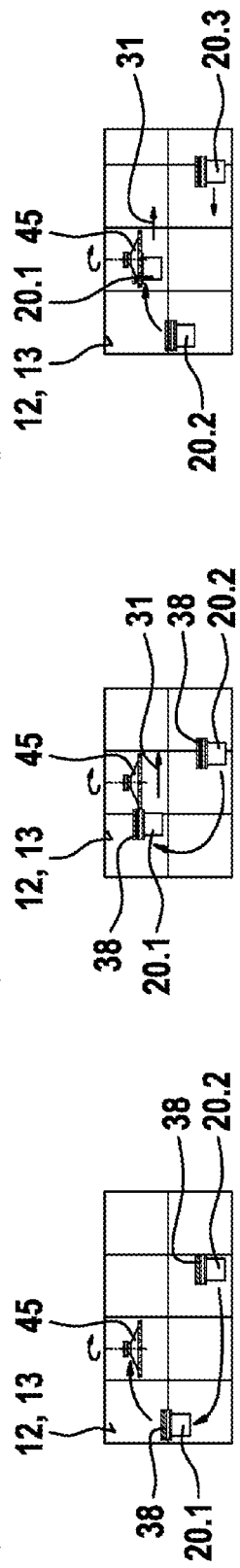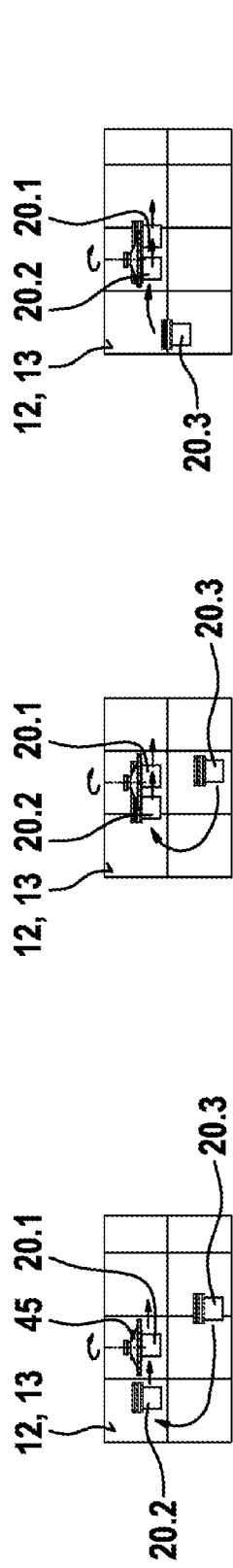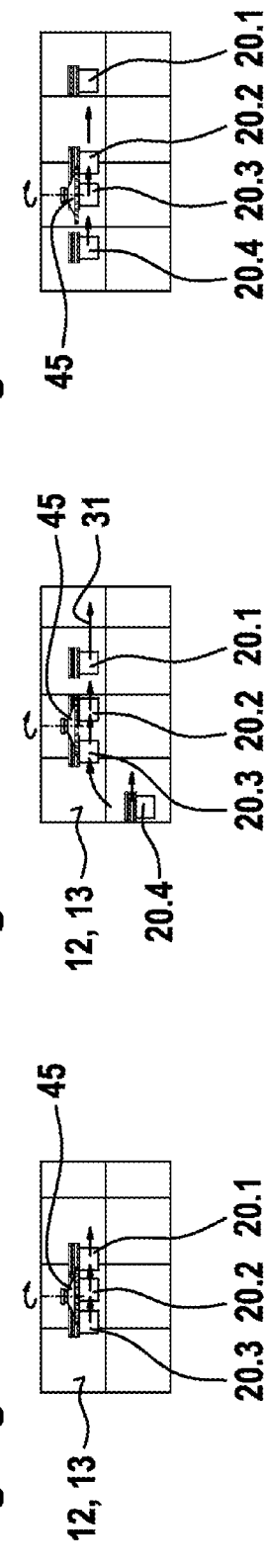

DEVICE FOR FILLING A RECEPTACLE

BACKGROUND OF THE INVENTION

The invention relates to a device for filling a receptacle.

A system for transporting receptacles between different stations is already known from WO 2011/138448, wherein the receptacles are received in receptacle carriers. The system comprises a control unit which controls the transport of the receptacle carriers, a transport surface which is divided into sub-areas and on which the receptacle carriers can be movably arranged, and drive means, wherein the drive means are controlled by the control unit and each sub-area is assigned a corresponding drive means, wherein a corresponding drive means is designed to act on an assigned receptacle carrier with a driving force. This system is characterized by high flexibility, as is required in particular for the transport of sample receptacles of a laboratory analysis system.

The object of the invention is to further optimize a filling system.

A device according to the invention has, by contrast, the advantage that sequential process steps or fixed process steps are no longer absolutely necessary. Because at least one driving surface and at least one mover, which can be coupled, in particular magnetically, to the driving surface are provided and the mover is arranged on the driving surface displaceably and/or rotatably in at least two degrees of freedom and the receptacle holder is arranged on the mover, the receptacles can be fed to and removed from the filling station in a particular flexible manner. In addition, as a result of this driving principle, the particle emission or the abrasion caused by relative movements of rollers, sliding elements or drive means, which are also required, can be reduced, since the mover can now be moved relative to the driving surface in a contactless manner on account of the magnetic coupling. This is advantageous especially for pharmaceutical filling facilities. In addition, the cleanability of the system is improved because only planar surfaces are necessary without the otherwise conventional mechanical connections, which are difficult to clean, between the drive and moved receptacle transport. Furthermore, the complexity in particular of the set-up or assembly of the processes relative to the filling station is reduced because the transport does not always have to make the receptacles available at a fixed position. Furthermore, the service life is increased by reducing the number of parts that are subject to wear. Furthermore, fixed, non-changeable mechanical routes can be avoided. Switchover functions are no longer bound to a particular location, but can be determined at any point within the driving surface as a result of corresponding programming. A flexible drive concept with superimposition of a rotational movement of the mover can have a direct influence on the sloshing behavior of a filled receptacle in that the mover generates a rotational movement that counteracts the sloshing of the filled product.

In an expedient embodiment provision is made so that the driving surface is formed as a vertical plane. Relative movements typical especially for the filling process as well as the transport beneath generally vertically oriented filling needles can thus be implemented particularly easily. The receptacle holder particularly preferably moves during the filling process. The filling needles can thus be fixedly arranged without hindering the filling process. The fixed arrangement of the filling needles has a particle-reducing effect, since frictions of the filling tubes or the like otherwise occurring are no longer present with a possible fixed pipe system.

In an expedient embodiment provision is made so that a plurality of movers movable independently of one another are provided. The process sequences can thus be flexible in that other stations can be approached depending on the state of the receptacle.

In an expedient embodiment provision is made so that at least one driving surface and at least one process mover, which can be coupled to the driving surface, in particular magnetically, are provided and so that at least one filling needle of the filling station is connected to the process mover in order to move the filling needle by the process mover. In spite of movable filling needles, the particle production is reduced, since it is possible to revert to a contactless and therefore low-abrasion drive system.

In an expedient embodiment provision is made so that the filling station comprises at least one pre-filling station and/or at least one end filling station, wherein the driving surface is designed so that the mover moves the receptacle carrier between the pre-filling station and the end filling station. Provision is made particularly expediently so that at least one closing station and/or at least one weighing means and/or at least one inspection means and/or an inlet and/or an outlet is provided and the driving surface is embodied so that the mover moves at least the receptacle holder to at least one of the aforementioned stations. The process sequences can thus be made flexible in that other stations can be approached depending on the state of the receptacle. In particular in the case of poor weighing results, the receptacle can be brought again to the filling station for re-filling, which is easily possible on account of a freely programmable route with this drive concept.

Further expedient developments will become clear from further dependent claims and from the description.

BRIEF DESCRIPTION OF THE DRAWINGS

Exemplary embodiments of the device according to the invention are illustrated in the drawing and will be described in greater detail hereinafter. In the drawing:

FIGS. 6a through 6i show the inlet situation with a planar drive in nine different states a to i.

DETAILED DESCRIPTION

Figure 1:
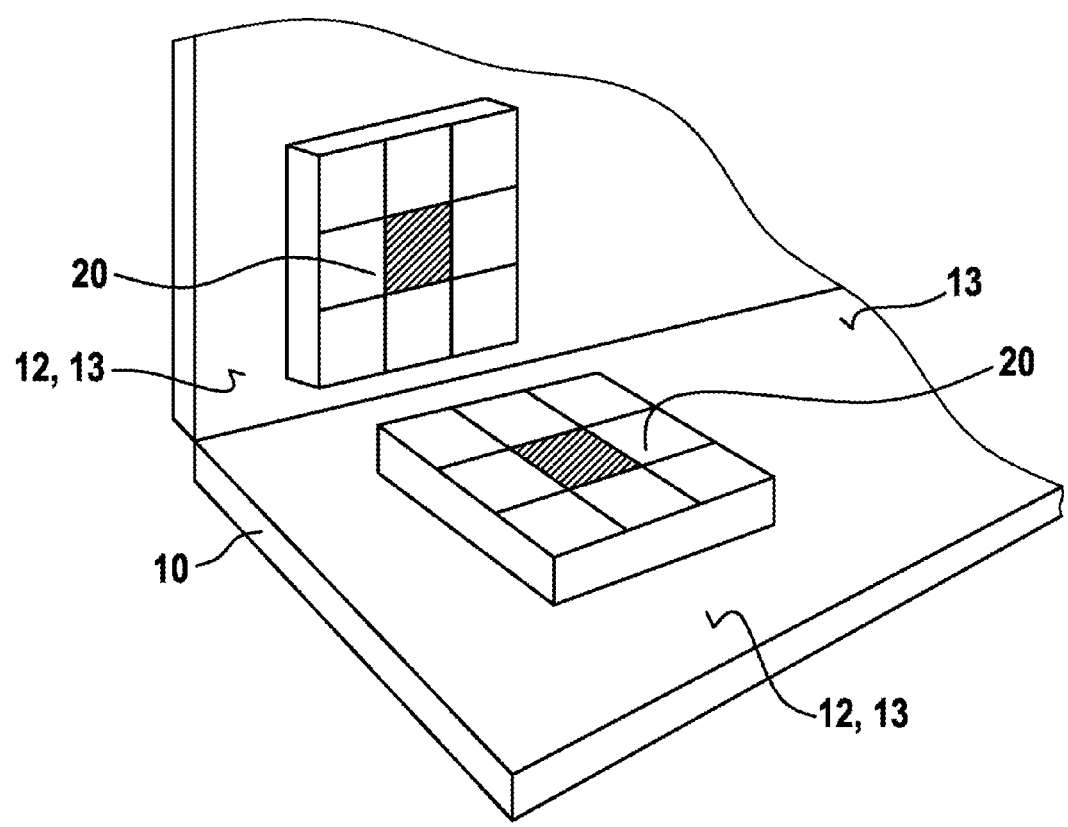
FIG. 1 shows both a passive mover module and an active mover module with coil assembly for voltage supply.

According to FIG. 1 the base platform 10 comprises a carrier plate 12 or a driving surface 13, on which at least one mover 20 is movably arranged. The mover 20 is a generally passive mover 20 which preferably comprises permanent magnets 19 which cooperate with coils on the carrier plate 12 or driving surface 13 in order to produce a relative movement. Alternatively, however, the mover 20 could also be actively operated in that the mover 20 comprises at least one coil assembly for voltage supply which cooperates with magnetic field-generating means (permanent magnets, coils) on the carrier plate 12 or driving surface 13 in order to generate a relative movement in a suitable manner. FIG. 1 in an exemplary manner shows the first carrier plate 12 or driving surface 13, which is formed as a horizontal plane, and also a further carrier plate 12 or driving surface 13, which borders the first carrier plate or driving surface and which is formed as a vertical plane. The two movers 20 arranged hereon are also flat and cooperate with the corresponding driving surfaces 13 so that a preferably contactless movement of the movers 20 relative to the driving surface 13 in the plane of the driving surfaces 13 in at least two degrees of freedom and also optionally a rotation about the normal of the driving surface 13 are possible.

Figure 2:
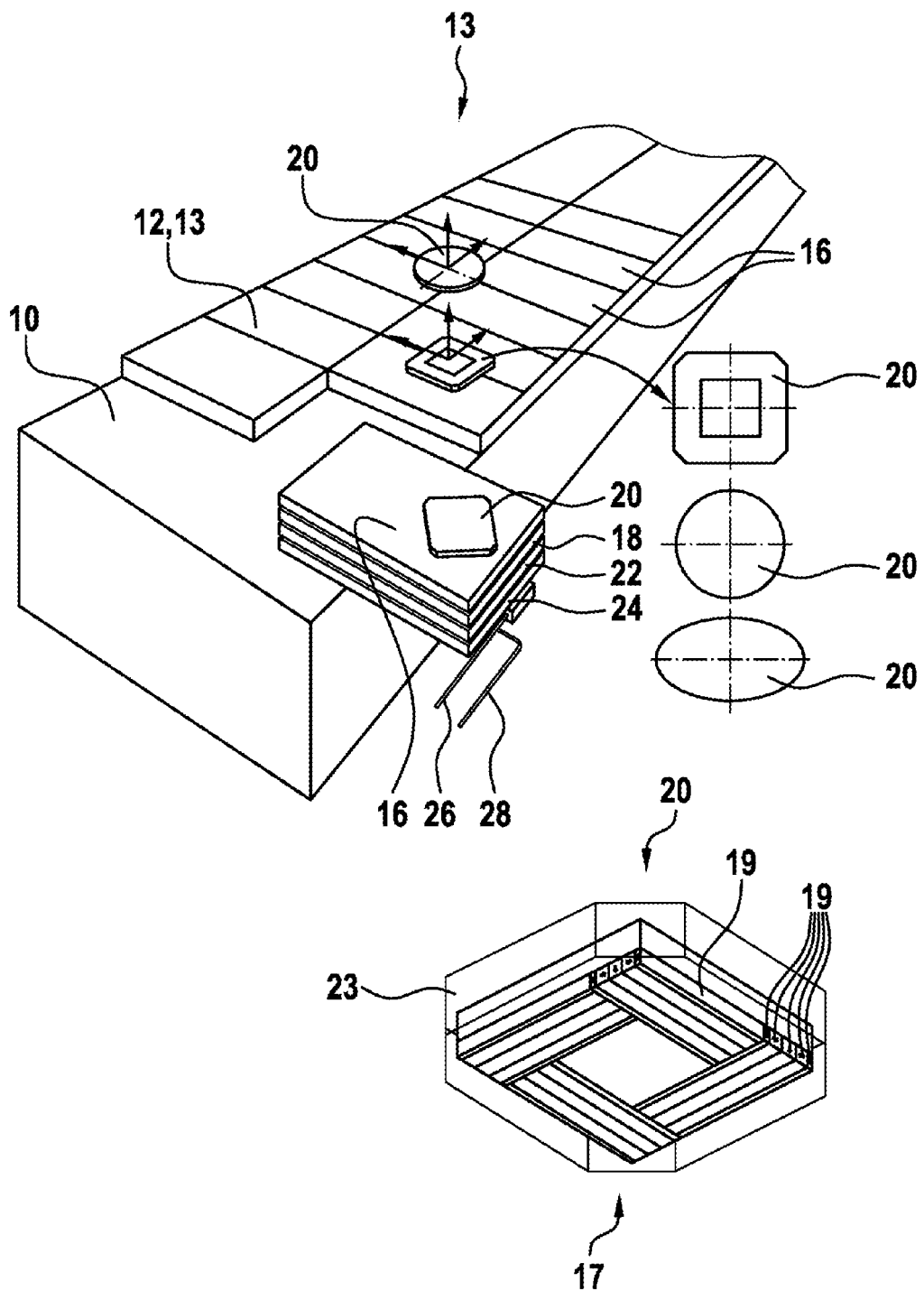
FIG. 2 shows a system illustration of the device.

In the exemplary embodiment according to FIG. 2, two movers 20 are illustrated by way of example, having different basic shapes, specifically a substantially rectangular mover 20 and a round mover 20. An oval shaping would also be conceivable. The carrier plate 12 or driving surface 13 consists of a number of individual parts or tiles 16. The tiles 16 are square or rectangular. The tiles 16 have a substantially planar surface and are constructed in layers. The tile 16 is square or rectangular. The tile 16 thus comprises a coil plane 18, a sensor plane 22, and a power electronics plane 24. A bus system 26 is also provided, which connects the tiles 16 to a central computer or processor (not illustrated). In addition, a voltage supply 28 is provided, which has associated connections, via which the power electronics plane 24 or the coil plane 18 and/or the sensor plane 22 can be supplied with energy.

The basic platform 10 describes the base element. These define the necessary design possibilities of the system in space. The basic platform 10 is understood to mean the system carrier or a machine frame. It must have the necessary rigidity. The basic platform 10 may already accommodate control components and power electronics. The carrier plate 12 or driving surface 13 could optionally already also be part of the basic platform 10. The basic platform 10 provides the base or the element for the arrangement of further functional units. The basic platform 10 is also the base or the element for the arrangement of further transport systems. The basic platform 10 should be compatible with other basic platforms. The movers 20 movable relative to the driving surface 13 are arranged thereon on the surface of the basic platform 10. The driving surface 13 or the carrier plate 12 for this purpose generates a driving force which acts on the mover 20 and sets it in the desired motion. The stationary driving surface 13 is preferably planar. The mover 20 is controlled such that it is displaceable and/or rotatable at least in two degrees of freedom. In particular, as described hereinafter, different stations can thus be started up in a flexible way when the driving surface 13 connects these to one another suitably.

The mover 20 describes the movable element of the device 8. The mover 20 serves to produce a relative movement in relation to the carrier plate 12 or driving surface 13. There is also the interaction between the movers 20 or between the mover components. The mover 20 also produces a force that acts on the carrier plate 12 or driving surface 13. For this purpose the mover 20 comprises at least one means for producing a magnetic field, in particular a magnet, preferably a permanent magnet 19, which cooperates with coils 18 of the carrier plate 12 or driving surface 13, which coils produce a field of travelling waves, in order to produce movement. Here, an air gap is formed between the carrier plate 12 or the driving surface 13 and the mover 20 so that the mover 20 can move contactlessly relative to the driving surface 13. The mover 20 can also comprise means for identifying a position.

In the view of FIG. 2 the mover 20 is illustrated perspectively. An underside 17 of the mover 20 cooperates with the carrier plate 12 or driving surface 13. A plurality of permanent magnets 19 is arranged on the underside 17 of the mover 20. The magnetic fields of adjacently arranged permanent magnets 19 differ from one another. The underside 17 consists substantially of four fields each having a number of permanent magnets 19. The middle region of the underside 17 does not have any permanent magnets 19. WO 2013/059934 A1 specifies yet further alternative embodiments incorporated in the disclosure of the present application. The mover 20 is surrounded by a collision guard 23, which is advantageous in the case of a multiplicity of moved movers 20.

The carrier plate 12 or driving surface 13 constitutes a multi-layered component according to FIG. 2. It has the following basic functionalities. It comprises means for producing a relative movement in relation to the mover 20. In addition, a force is produced which acts on the mover 20. In addition, it comprises means for producing distances (air gap) between the carrier plate 12 and the mover 20. In addition, the carrier plate 12 comprises means for identifying positions as well as means for identifying energy transfer and means for transmitting information.

Figure 3:
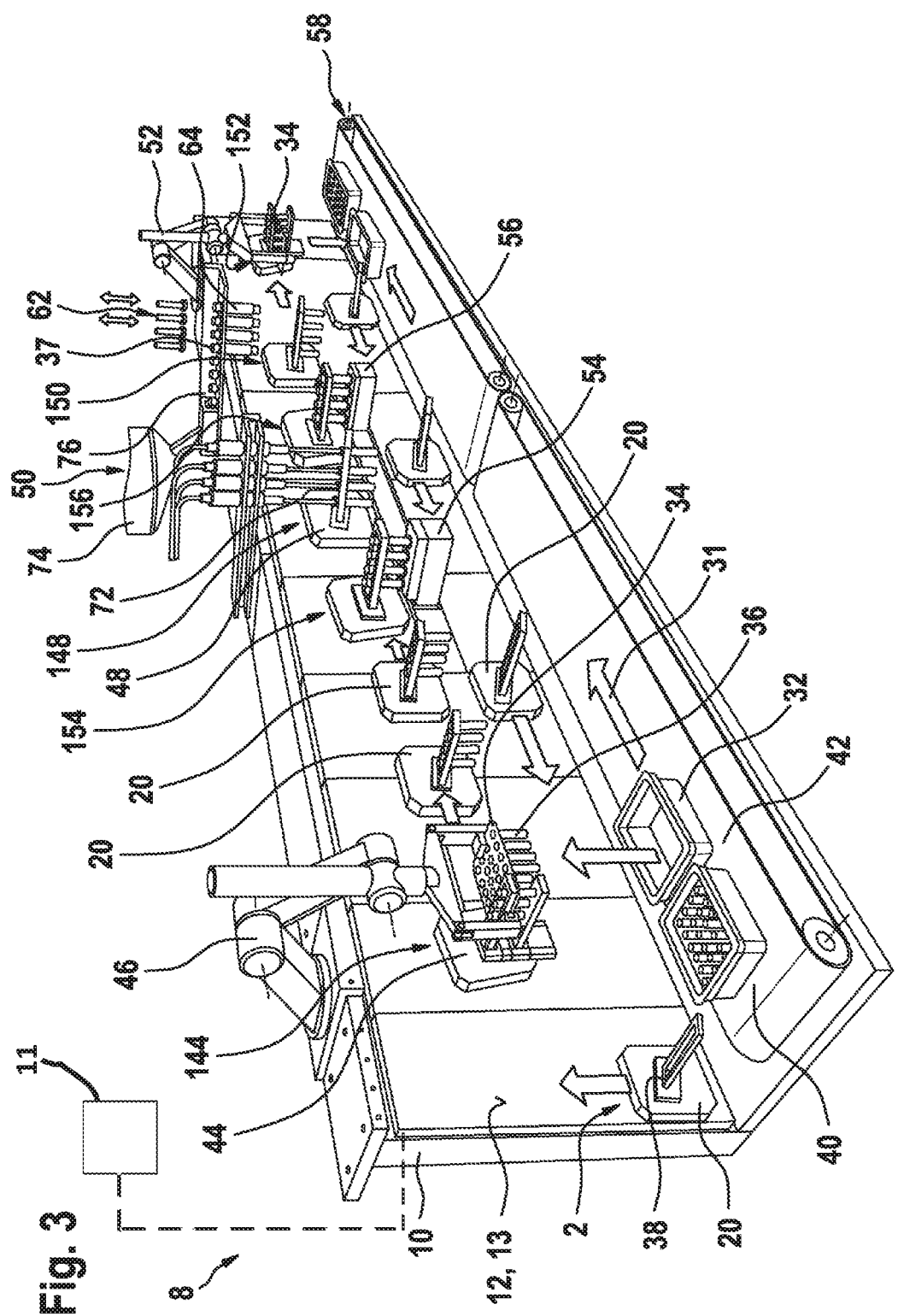
FIG. 3 shows a perspective illustration of a machine concept for filling pharmaceutical receptacles provided together in a nest.

The mover 20 according to FIG. 3 has at least one receptacle holder 38 for holding at least one receptacle 36 to be transported. The receptacle holder 38 is preferably slot-shaped, such that a number of receptacles 36 can be arranged adjacently and can be held by the holder 38. However, another embodiment of the receptacle holder 38 is also possible. Furthermore, the mover 20 could comprise means for moving the receptacles 36. The mover 20 is preferably encapsulated in order to protect the internal magnets against ambient influences, such as corrosion. A process mover 21 is technically structured identically or similarly to the mover 20, but instead of moving the receptacles 36, moves components of process stations, as will be discussed hereinafter in greater detail. The working principle or the cooperation with the described driving surfaces 13, however, remains unchanged.

The device 8 for processing receptacles 36, which in particular are provided together in a nest, can be explained in greater detail with reference to FIG. 3. Receptacles 36 provided in a nest 34 are delivered in a tub 32, i.e. a trough-like receptacle, as illustrated. The nest 34 serves to receive the receptacles 36 in particular in the tub 32. A tub inlet 40 forms the interface to an upstream machine (not shown). The tubs 32 are moved in a transport direction 31, indicated by an arrow, by a transport means 42. Various conventional transport solutions (line, belt) can be used, although a solution with a transport belt as transport means 42 is illustrated. In accordance with the illustration according to FIG. 1, the transport of the tubs 32 in a horizontal plane by means of a planar drive, i.e. with use of the mover 20, which is arranged on the horizontally oriented carrier plate 12 or driving surface 13 and which is designed to transport the tub 32, is also possible in principle.

In accordance with FIG. 3, the carrier plate 12 or driving surface 13 is formed as a vertical plane for moving the movers 20. The mover 20 moves from a starting position 120, shown at the front on the left, upwardly into a separating position 144. In the separating position 144 the mover 20 is disposed within the reach of a removal means 46. The removal means 46 is formed for example as a robot or robot arm. It serves to remove a nest 34 provided with receptacles 36 from the tub 32. The removal means 46 is able to remove at least one row of receptacles arranged perpendicularly to the transport direction 31 and/or to deposit said receptacles in the receptacle holder 38 of the mover 20 by means of an up-and-down movement. The receptacles 36 disposed in the nest 34 are thus removed in rows and thus separated. Separation in rows is understood to mean that a number of receptacles 36 are arranged substantially in single rows perpendicularly to the transport direction 31.

Where applicable, the mover 20 can remove the receptacles 36 from the tub 32 provided by the removal means 46 in that the mover 20 itself produces a corresponding removal movement relative to the removal means 46. In the removal position, the mover 20 for this purpose moves the receptacle holder 38 over the openings in the receptacles 36 provided for removal. The width of the preferably slot-shaped recess in the receptacle holder 38 is larger than the diameter of the neck of the receptacle 36. The mover 20 moves the receptacle holder 38 in such a way that the recess can enclose the receptacles 36. The receptacles 36 enclosed by the receptacle holder 38 are then held in that the mover 20 rotates the receptacle holder 38 such that the receptacles 36 are clamped as a result. The inner edges of the preferably slot-shaped recess thus come into contact from both sides with the side walls of the receptacle 36. Following the rotation or form-locked contact between the receptacle holder 38 and the receptacles 36, the mover 20 moves upwardly and removes the receptacles 36, which are now separated in rows. Alternatively, the nest 34 could also be lowered.

The removed receptacle rows are transported by the mover 20 from the separation position 144 to a weighing means 54 in a weighing position 154. Here, the mover 20 and therefore also the receptacle holder 38 maintains the slightly tilted position as indicated in FIG. 3 so that the receptacles 36 continue to be reliably clamped and held. This weighing means 54 weighs the empty receptacles 36, i.e. is used to establish a tare weight. For this purpose, the mover 20 could release the receptacles 36 to be weighed on the weighing means 54 by means of a corresponding up-and-down movement in the vertical direction. This release is implemented by a tilting movement of the mover 20 and therefore of the receptacle holder 38 in an opposite direction so that the receptacles 36 are no longer held in a clamped manner. The particular advantage of the separation in rows manifests itself particularly at the time of weighing. Conventional weighing means 54, 56 can thus be used, which are designed for at least single-row weighing, as is conventional. In the case of the nest-based processing conventional until now, this is possible at best with great outlay, such that only a small percentage is usually weighed. The weighing could be performed in rows or also individually.

Once weighing has been performed in the (first) weighing position 154, the mover 20 transports the weighed empty receptacles 36 into a filling position 148, at which a filling station 48 is arranged. For this purpose, the mover 20 tilts the receptacle holder 38 such that the previously released receptacles 36 are held in a clamped manner again.

The filling station 48 comprises filling needles 72. The filling needles 72 are preferably arranged in a row, particularly preferably in a row perpendicular to the transport direction 31. The liquid to be filled can be formed by pharmaceuticals, for example. In the filling position 148 the filling needles 72 are moved towards the receptacles 36 by means of a relative movement. This could be implemented in that the filling needles 72 are themselves movable and/or the receptacles 36 are moved or raised by the mover 20. In the variant shown in FIG. 3 the relative movement is performed solely by the mover 20 moving the receptacles 36. The mover 20 maintains the rotation for holding the receptacles 20 in a clamped manner. The mover 20 also removes the receptacles 36 during the filling process along the axis of the filling needles 49. This relative movement can change during the filling process. With increasing fill level in the receptacle 36, the mover 20 lowers the container 36 down. A bothersome formation of bubbles during the filling process is thus reduced. Once filling is complete, the filling needles 72 are moved away from the receptacles 36 by means of a relative movement. This could be implemented in that the filling needles 72 are themselves movable and/or the receptacles 36 are moved or lowered by the mover 20. In the exemplary embodiment the mover 20 lowers the receptacles 36 further, parallel to the axis of the filling needles 72, such that a collision-free lateral movement is then possible.

Once filling is complete, the mover 20 transports the filled receptacles 36 into a further weighing position 156 within the range of a (further) weighing means 56. The transport can now be performed such that a sloshing of the filled receptacles 36 is prevented by a suitable pivoting of the receptacles 36 about a horizontal axis. For this purpose, a further tilting is performed in accordance with a specific movement profile, wherein the clamped holding of the receptacles 36 is maintained. The anti-slosh function will be explained in greater detail further below in conjunction with FIG. 7.

The net weight is established at the weighing means 56. Here, similarly to the tare weighing position 154, the filled receptacles 36 are set down on and received by the weighing means 56 or alternative fill volume detection means. The following functions are performed in the weighing position 156: holding by appropriate clamping of the receptacles 36, releasing the receptacles 36 by appropriate rotation of the receptacle holder 38 in an opposite direction so that the receptacles 36 are no longer held in a clamped manner for weighing, and subsequent clamped holding of the receptacles 36 by means of a rotation of the mover 20.

Should the net weighing in the weighing position 156 reveal that an intolerable volume has been filled, the mover 20 could eject the corresponding receptacle 36 and/or possibly bring it into the filling position 148 for additional dosing.

The weighed receptacles 36 are brought by the mover 20 into a closing position 150, which is disposed within the range of a closing station 50. The closing station 50 comprises at least one seating tube 64 and a ram 62. Seating tubes 64 and rams 62 are arranged in rows, in particular in a row perpendicular to the transport direction 31. Closures 37, such as stoppers, are also fed to the seating tubes 64 with the aid of a feeder 76 in order to close the filled receptacle 36. The closure 37 passes into the seating tube 64. The seating tube 64 is designed such that the closure 37 is slightly compressed peripherally so that it then expands again in the container opening and thus closes this. The closure 37 is brought into a suitable position above the container opening. A relative movement is then performed between the receptacle 36 and closure 37 in that the ram 62 dips into the seating tube 64 and presses the closure 37 into the container opening. Alternatively or additionally, the receptacle 36 could also be moved itself toward the closure 37 by the mover 20. The receptacle 36 is closed.

The closed receptacles 36 are then brought into a reset position 152 so as to be reset in the nest 34. The mover 20 for this purpose brings the closed receptacles 36 into the range of a handling means 52. This handling means 52 can be a robot, for example. The handling means 52 for example removes the empty nest 34 transported by a tub 32. The mover 20 places the separated receptacle row back into the nest 34. For this purpose the receptacles 36 held in a clamped manner are brought into the reset position in the nest 34. By rotating the mover 20 or the receptacle holder 38 in an opposite direction, preferably in the horizontal direction, the clamping is cancelled again. The mover 20 then moves the receptacle holder 38 without the receptacles 36.

Once all rows of the nest 34 have been provided with receptacles 36, the handling means 52 places the nest 34 filled with receptacles 36 back into the empty tub 34 by lifting and lowering. This reset functionality can be implemented with the aid of the mover 20 and the handling means 52, for example a robot or external axis gantry or the like.

The mover 20 then moves from the reset position 152 back into the starting position 140. This could be implemented for example with a mover 20 embodied as an active planar drive. Alternatively, a planar drive with a static field of traveling waves and/or an additional guide would be possible, but also a passive conveyor means (such as a chain, belt, etc.).

The filled tub 32 is disposed at an outlet 58, which serves as an interface to a downstream machine.

The following optional process steps can be integrated into the processing operation. This can be implemented in an application-specific and modular manner: closing gassing, vacuum stop placement, pre-gassing, double chamber, syringe/cartridge, flanging, mixing ball insertion, for example suspension, inspection (front closure, receptacle, needle, stopper seat, residual oxygen, fill level, residual air bubbles), removal station, labeling, product loss avoidance.

A device 8 for processing receptacles 36, in particular cartridges, can be explained in greater detail with reference to FIG. 4. Receptacles 36 to be filled are delivered in a manner not illustrated in greater detail. In particular, these can be receptacles 36 to be filled with liquid pharmaceuticals, such as syringes, ampoules, cartridges, vials or the like.

An inlet 40 forms the interface to an upstream machine (not shown). The receptacle holder 38 according to FIG. 4 consists of two strips provided with coaxial recesses in the shape of part of a circle, said strips running along the surface of the mover 20. By way of example, four receptacles 36 can be accommodated. However, another suitable number is also possible.

Figure 4:
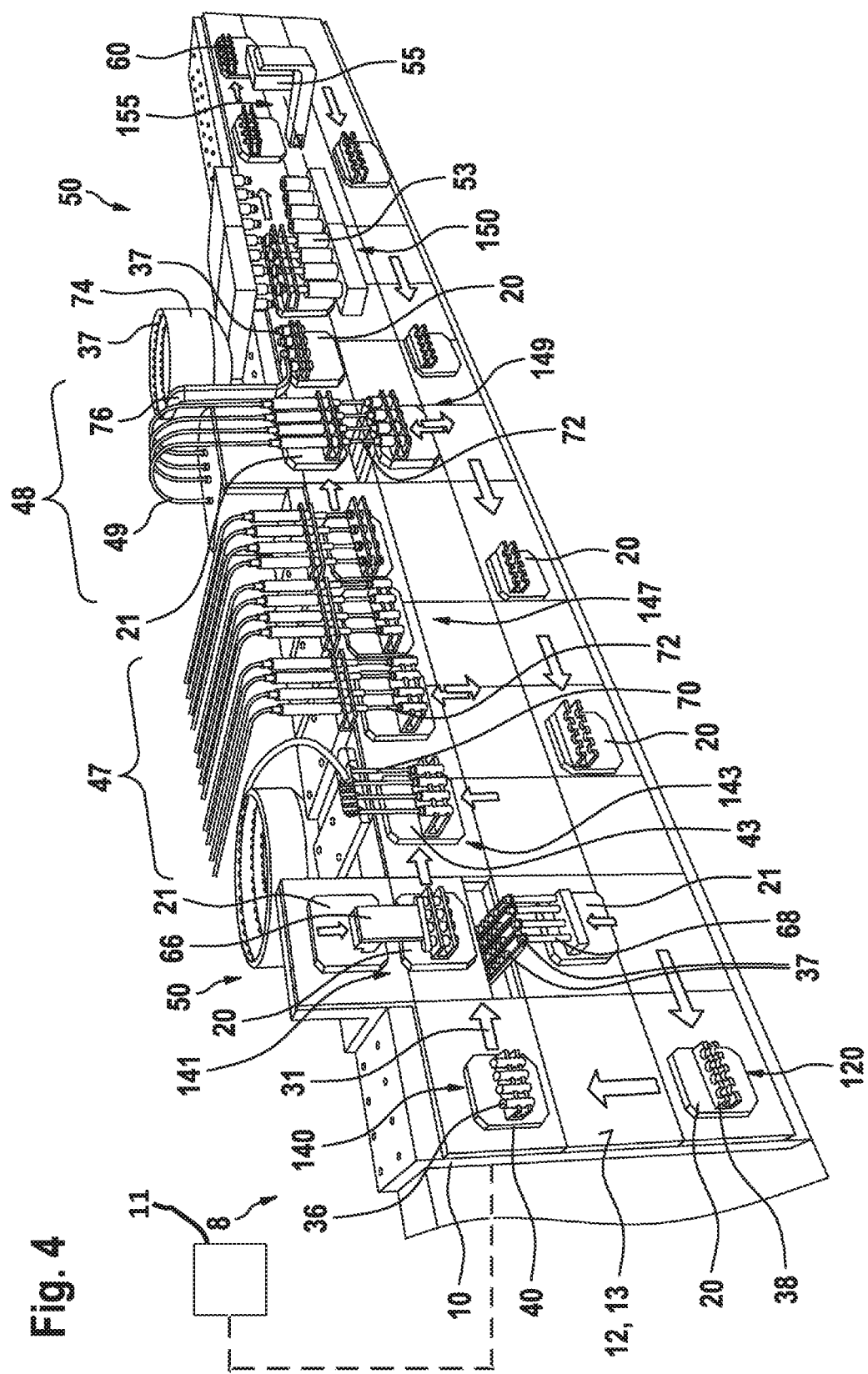
FIGS. 4 and 5 show perspective illustrations of further machine concepts for filling pharmaceutical receptacles in particular.

In accordance with FIG. 4, the carrier plate 12 or driving surface 13 is formed as a vertical plane for moving the mover 20. The mover 20 moves from a starting position 120, shown at the front on the left, upwardly into an inlet position 140. In the inlet position 140 the mover 20 is within reach of the fed receptacles 36. In the inlet position 140 the fed receptacles 36 are brought into the receptacle holders 38 via handling means (not shown in greater detail) or the like.

The received receptacles 36 are transported by the mover 20 from the inlet position 140 to a closure station 50, in particular for the insertion of plungers as closures 37 conventional for this purpose, such as for cartridges, which are typically glass tubes open at the top and bottom, in an insertion position 141. Here, the receptacles 36 are closed from below by closures 37 (stoppers). The closure station 50 comprises at least one holding-down means 66 and a ram 68. A plurality of holding-down means 66 and rams 68 are arranged in succession parallel to the transport direction 31 or to the driving surface 13 in accordance with the holding geometry of the receptacle holder 38. Here, different variants are possible for producing a relative movement between stoppers or closures 37 and receptacles 36. The holding-down means 66 and/or the ram 68 could thus be moved by a servo drive or also with the aid of a mover 20 or a process mover 21. In FIG. 4 a variant is shown in which the holding-down means 66 and ram 68 are each moved by process movers 21. Process movers 21 are understood to be movers 20 that move specific process steps (closing, for example plunger placement, filling, etc.) with the associated components, but do not directly move the receptacles 36. As the closures 37 are placed in position, the upper process mover 21 moves the holding-down device 66 toward the upper side of the receptacles 36 provided by the mover 20. The lower process mover 21 moves the closures 37 received by the ram 68 upwardly and presses them into the underside of the receptacles 36.

Once the receptacles 36 have been closed downwardly by the closures 37 (stoppers) in the insertion position 141, the mover 20 brings the receptacles 36 into a ball placement position 143. Here, the receptacles 36 are disposed under feeders 70 of a ball placement station 43, via which one or more balls are brought inside the receptacle 36, as is necessary for certain administration forms of specific pharmaceuticals.

Once the ball(s) has/have been placed in position, the mover 20 brings the receptacles 36 into a pre-filling position 147. There, a number of filling needles 72 of a pre-filling station 47 can be provided, below which the mover 20 brings the receptacles 36 to be pre-filled. The filling needles 72 are for this purpose arranged in rows parallel to the movement direction 31. A number of pre-filling points can be provided, with three pre-filling points each having four filling needles 72 being provided in FIG. 4 by way of example. The mover 20 can be controlled such that it approaches a free pre-filling point. A corresponding sensor system is provided for this purpose in order to evaluate the current mover positions, said sensor system identifying the presence of a mover 20 at a pre-filling point and activating the corresponding driving surfaces 13 via a superordinate controller 11 (shown schematically in FIGS. 3-5) so that the mover 20 does not approach an occupied pre-filling point.

The filling needles 72 can be arranged either rigidly, as shown in FIG. 4, or movably. In any case, a relative movement between the filling needles 72 and receptacle 36 is preferred. The filling is performed preferably above or below the fill level depending on the product type in order to promote bubble-free filling. For this purpose, the filling needles 72 and/or receptacle 36 are/is moved. The filling needles 72 could be moved by a servo drive or a mover 20 or process mover 21. In the exemplary embodiment according to FIG. 4, however, the receptacles 36 are moved relative to the filling needles 72 with the aid of the mover 20. During the filling, the mover 20 moves the receptacles 36 downwardly away from the filling needles 72, parallel to the axis of the filling needles 72. Due to a movement-free filling process, an advantage of a rigid filling needle 72 lies in reduced particle emissions in this particle-sensitive process region, as could otherwise occur for example by friction with movement of the feed lines or the like. In this variant the filling needles 72 can also be fixedly attached, for example. The mover 20 could also be arranged at a slight incline during the filling process in order to promote bubble-free filling. The receptacles 36 could be lowered at a slight incline parallel to the axis of the filling needles 72 during the filling process.

Once pre-filling is complete, the mover 20 moves the pre-filled receptacles 36 from the pre-filling position 147 into a residual filling position 149. There, an end filling station 49 comprises a plurality of filling needles 72 arranged in rows parallel to the transport direction 31 and also a corresponding sensor system, via which the accurate residual filling can be controlled and monitored. As already in conjunction with the pre-filling station 47, a relative movement between the receptacles 36 and the filling needles 72 should be possible during the filling. In the exemplary embodiment according to FIG. 4 the filling needles 72 of the end filling station 49 are now arranged movably on a process mover 21. Via the movement of the process mover 21, a filling above or below the fill level can again be achieved in that the filling needles 72 retract upwardly from the receptacles 36 parallel to the axis of said receptacles during the filling process. Alternatively, it would be conceivable for the filling needles 72 and/or the receptacles 36 to be arranged at a slight incline during the filling in order to optimize the filling process. Alternatively, it would also be conceivable to also move the receptacles 36, in addition to the filling needles 72, during the filling process.

Once the residual filling is complete the mover 20 brings the correctly filled receptacles 36 from the residual filling position 149 into a position 151 in which a closure 37 or a cap is fed to the receptacle 36. A closure station 50 comprises a receptacle 74, in which the closures 37 are stored and are suitably provided in separated form via a feeder 76. Here, the mover 20 moves the receptacle 36 with a preferably continuous towing movement along the feeder 76 so that the closure 37 comes to rest on the receptacle opening.

The mover 20 then moves the receptacle 36 provided with a closure 37 into a closing position 150. There, the closure 37 and receptacle 36 are within the range of a closing station 50. The closing station may be a flanging station 53, for example. The corresponding flanging rolls are not illustrated. The mover 20 positions the receptacles 36 within the range of the flanging station 53, which provides a form-fitting connection between the closure 37, such as an aluminum cap, and the receptacle 36. The receptacles 36 are then closed as desired.

The mover 20 can then bring the closed receptacles 36 into an optionally possible inspection position 155, which is disposed within the range of an inspection station 55. This could be provided with a corresponding sensor system in order to automatically detect and assess the desired inspection criteria.

The closed receptacles 36 are then brought into an outlet position 160 within the range of an outlet 60, which feeds the receptacles 36 to further processing steps as appropriate. The transfer can be performed with the aid of the mover 20 and/or a handling means 52, for example a robot or external axis gantry or the like.

The empty mover 20 then moves from the outlet position 160 back into the starting position 140 again. This could be performed for example with a mover 20 embodied as an active planar drive. Alternatively, a planar drive with a static field of travelling waves and/or an additional guide would be possible, or also a passive conveyor means (such as a chain, belt, etc.).

Figure 5:
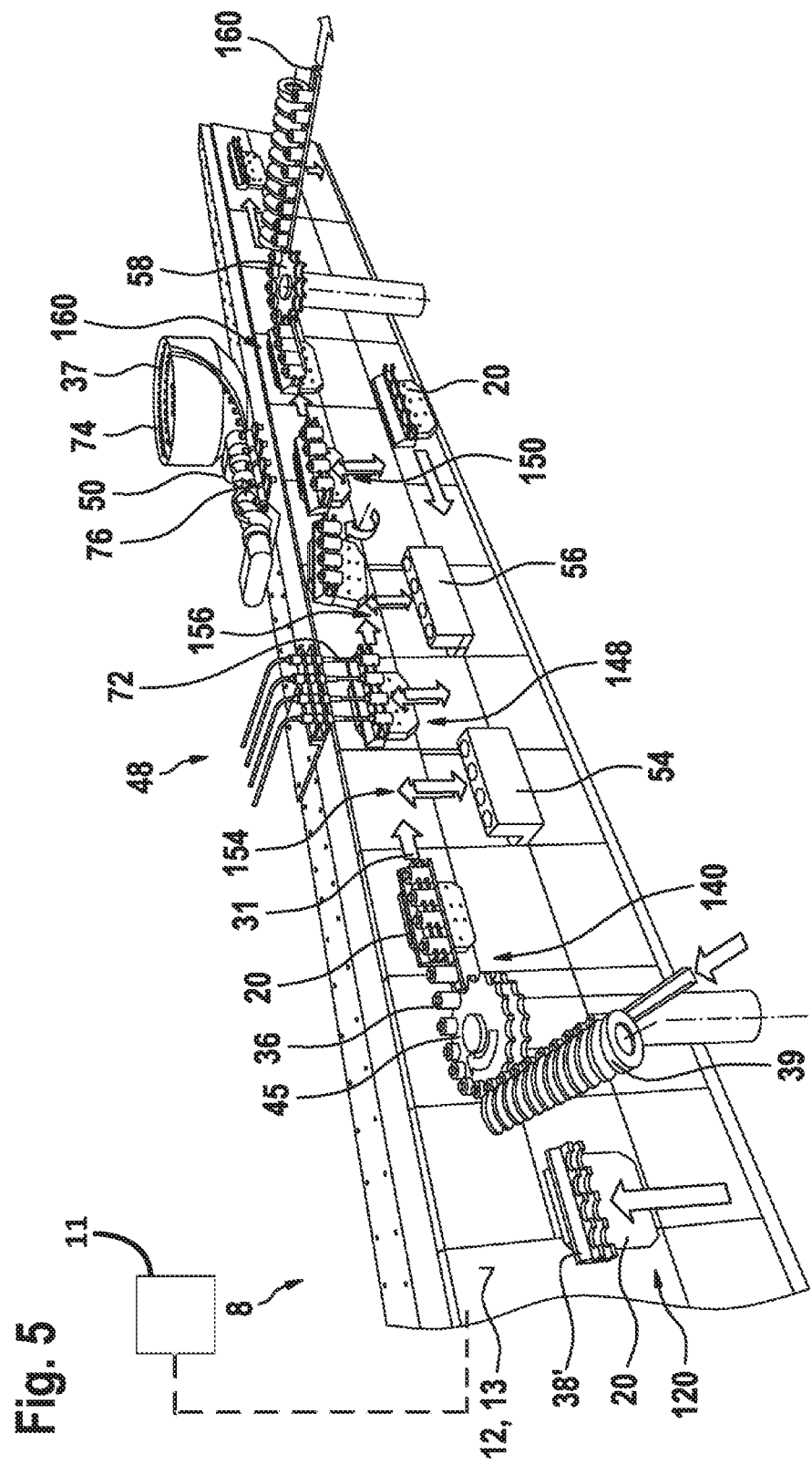

FIG. 5 shows a device 8 for processing receptacles 36, in particular ampoules or vials. The receptacles 36 to be filled are fed via a conveying screw 39 perpendicularly to the plane of the carrier plate 12 or driving surface 13. A deflection wheel 45 deflects the receptacles 36 by 90° parallel to the surface of the carrier plate 12 into an inlet position 140. There, the mover 20 transfers the receptacles 36 from the inlet 40 into the receptacle holder 38. Suitable handling solutions can be provided for this purpose, which perform this transfer. By way of example, at least two movers 20 can be provided, which are brought directly adjacently to one another between the deflecting wheel 45 and the carrier plate 12 or the driving surface 13. The movers 20 move at the same speed as the incoming receptacles 36 at the deflecting wheel 45. A third mover 20 is already waiting when all receptacle holders 38 of the first mover 20 are filled and this leaves the range of the deflecting wheel 45. During this process the second mover 20 is filled at synchronized speed with receptacles 36 fed from the deflecting wheel 45, and so on.

The various steps of the holding of the receptacles fed via the deflecting wheel 45 are shown in FIG. 6. The deflecting wheel 45 rotates about an axis parallel to the plane of the carrier plate 12 or driving surface 13, as is also shown in FIG. 5. The outwardly arranged receptacle holders of the deflecting wheel 45 are arranged at a distance from the driving surface 13 even in the position closest to the driving surface 13. This distance is selected such that the receptacle holder 38 of the mover 20 can be arranged between the driving surface 13 and next outer receptacle holder of the deflecting wheel 45 such that the receptacle 36 to be transferred fits between both holders.

In a first step (FIG. 6a) the first mover 20.1 and second mover 20.2 are disposed in the vicinity of the deflecting wheel 45, but are not engaged. In the second step (FIG. 6b), the first mover 20.1 brings the receptacle holder 38 to a height with the deflecting wheel 45. The first mover 20.1 orientates the receptacle holder 38 parallel to the plane of the deflecting wheel 45, for example horizontally as in FIGS. 5 and 6. The second mover 20.2 moves closer to the deflecting wheel 45. In a third step (FIG. 6c) the first mover 20.1 moves at the same speed as the rotational speed of the receptacle holder of the deflecting wheel 45. The first mover 20.1 is synchronized with this. The receptacle holders of the deflecting wheel 45 and first mover 20.1 are also arranged in relation to one another such that the receptacle 36 arranged therebetween can be reliably transferred to the first mover 20.1. The second mover 20.2 moves closer, as does a third mover 20.3. In a fourth step (FIG. 6d) the second mover 20.2 is suitably oriented. The first mover 20.1 continues to move synchronously with the deflecting wheel 45 toward the holder of the receptacles 36. The third mover 20.3 continues to move toward the deflecting wheel 45. In a fifth step (FIG. 6e) the second motor 20.2 is synchronized and moves at the same speed as the holders of the deflecting wheel 45. The container holder 38 directly adjoins that of the first mover 20.1. The first mover 20.1 continues to move at constant speed and receives the receptacles 36 fed by the deflecting wheel 45. In a sixth step (FIG. 6f) the first and second mover 20.1, 20.2 continue to move at the same speed within the range of the deflecting wheel 45. The third mover 20.3 moves closer. In a seventh step (FIG. 6g) the third mover 20.3 moves its receptacle holder 38 at the same height as that of the deflecting wheel 45. The first and second mover 20.1, 20.2 continue to move. The first mover 20.1 starts to leave the region of the deflecting wheel 45. In the eighth step (FIG. 6h) the first mover 20.1 is no longer engaged with the deflecting wheel 45 and moves the receptacle holder 38 now provided fully with receptacles 36 to the next process station. The second and third movers 20.2, 20.3 continue to move at the same speed as the deflecting wheel 45. A fourth mover 20.4 is brought into the vicinity of the deflecting wheel 45. In a ninth step (FIG. 6i) the receptacle holder 38 of the fourth mover 20.4 is moved at the same height as the holders of the deflecting wheel 45. The second and third mover 20.2, 20.3 move directly behind one another at the same speed as the peripheral speed of the holders of the deflecting wheel 45. The steps of FIG. 6g are then performed again.

In accordance with FIG. 5 the carrier plate 12 or driving surface 13 is formed as a vertical plane for moving the mover 20. The mover 20 moves from a starting position 120, shown at the front on the left, upwardly into the holding position 140. Corresponding holding, gripping and positioning functions are to be performed in the holding position 140. The removed receptacle rows are transported by the mover 20 from the holding position 140 to a weighing means 54 into a weighing position 154. The weighing means 54 comprises a plurality of weighing cells (not shown in greater detail), which are arranged in a row parallel to the transport direction 31. The weighing means 54 can move upwardly and downwardly, as indicated by arrows, in order to come into contact with the receptacles 36 to be weighed. This weighing means 54 weighs the empty receptacles 36, i.e. serves to establish a tare weight. The mover 20 for this purpose can release the receptacles 36 to be weighed on the weighing means 54 as a result of a corresponding up-and-down movement in the vertical direction. This could be performed in rows or also individually. The following functions of the mover 20 or receptacle carrier 38 are to be performed in the weighing position 154: setting down and holding of the receptacles 36 on the weighing means 54.

Once weighing is complete in the (first) weighing position 154, the mover 20 transports the weighed empty receptacles 36 into a filling position 148, at which a filling station 48 is arranged. The filling station 48 has filling needles 72, which are preferably arranged in a row oriented parallel to the transport direction 31. The liquid to be filled can be formed by pharmaceuticals, for example. In the filling position 148 the filling needles 72 are moved relative to the receptacles 36. This could be implemented in that the filling needles 72 are themselves movable and/or the receptacles 36 are moved or raised by the mover 20. The filling needles 72 could be moved during the filling process by a process mover 21 in an alternative (not shown), similarly to the exemplary embodiment according to FIG. 4. This relative movement can change during the filling process, as already described in greater detail in conjunction with the exemplary embodiments according to FIGS. 3 and 4. Once filling is complete, the filling needles 72 are moved away from one another relative to the receptacles 36. This could be implemented in that the filling needles 72 are themselves movable and/or in that the receptacles 36 are moved or lowered by the mover 20.

Once filling is complete, the mover 20 transports the filled receptacles 36 into a further weighing position 156 within the range of a further weighing means 56. The transport can now occur such that a sloshing of the filled receptacles 36 is prevented by a suitable pivoting of the receptacles 36 about a horizontal axis, as indicated by a corresponding arrow.

The net weight is established at the weighing means 56. Here, similarly to in the tare weighing position 154, the filled receptacles 36 are set down and held by the weighing means 56 or alternative fill volume detection means. The further weighing means 54 is also again movable in order to hold the receptacles 36 to be weighed. The following functions of the mover 20 or receptacle holder 38 are to be performed in the weighing position 156: setting down and holding the receptacles 36 on the weighing means 56.

Should the net weight established in the weighing position 156 reveal that an intolerable volume has been filled, the mover 20 could eject the incorrectly filled receptacle 36 or possibly bring it into the filling position 148.

The mover 20 brings the weighed receptacles 36 into a closing position 150, which is disposed within the range of a closing station 50. The closing station 50 is formed as a stopper placement station by way of example. It comprises at least one receptacle 74 for the closures 37, which a feeder 76 provides suitably. A relative movement is then performed between the receptacle 36 and closure 37. The mover 20 for this purpose moves the open receptacle 36 upwardly so that the closures 37 can be inserted into the receptacle openings.

The closed receptacles 36 are then brought into an outlet position 160 for transfer into an outlet 60. A deflecting wheel 58 is provided for this purpose, which receives the fed receptacles 36 and transfers them into the outlet 60 in the form of a conveying screw after a 90° rotation. Here, the mover 20 is synchronized to the speed of the deflecting wheel 58 so that it moves in the transfer position at the same speed as the peripheral speed of the conveying wheel 58.

The mover 20 moves from the outlet position 160 back into the starting position 120 again. This could be implemented for example with a mover 20 embodied as an active planar drive. Alternatively, a planar drive would be possible with a static field of travelling waves and an additional guide, or also a passive conveying means (such as a chain, drive, etc.).

The filled receptacle 36 is disposed in the outlet 60, which serves as an interface to a possible downstream machine.

The following optional process steps can be integrated into the processing. This can occur in an application-specific and modular manner: gassing, rolling, poor/good outlet, inspection, removal station, screw station, labeling, magazining, and product loss avoidance.

Figure 7:
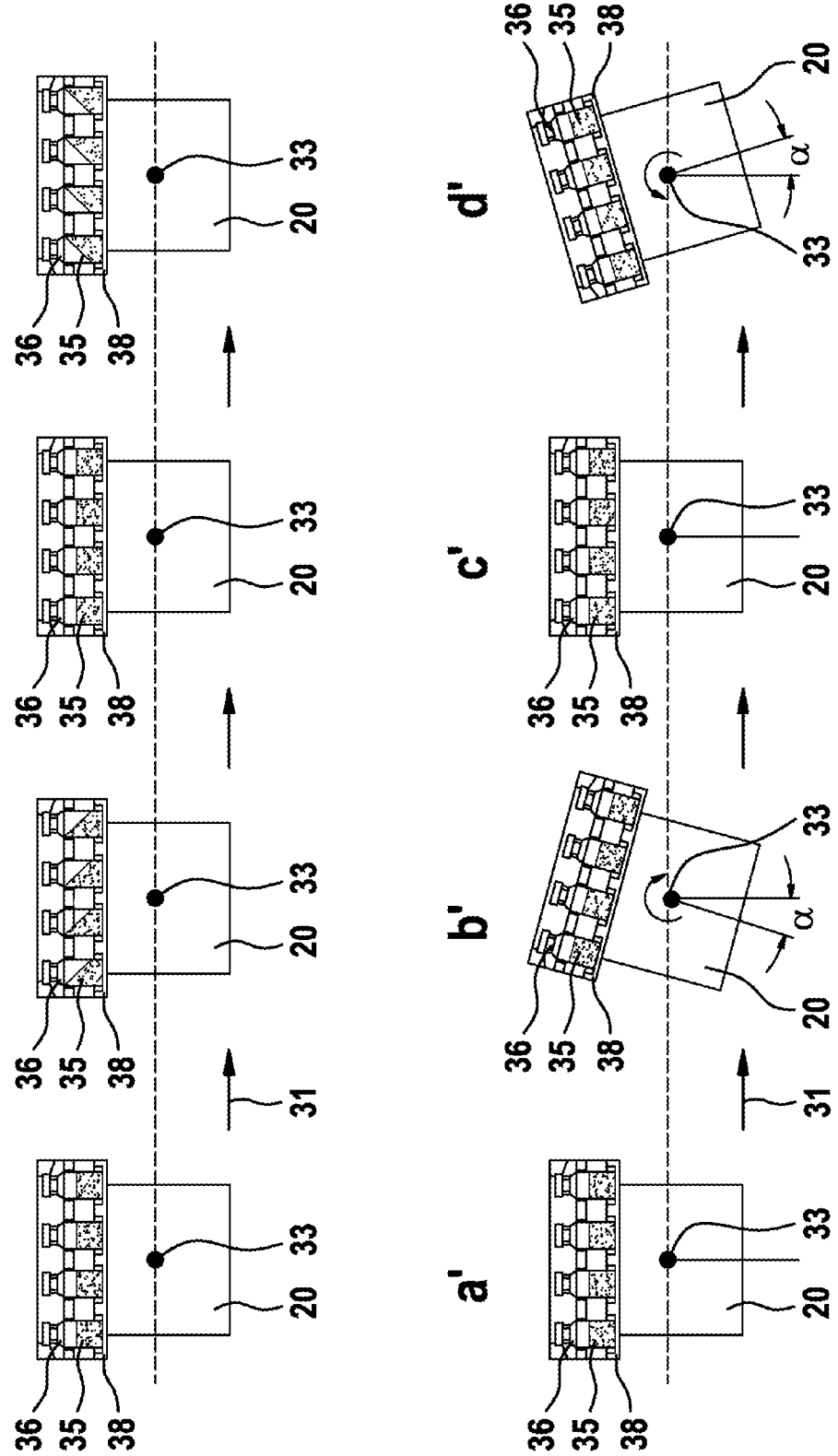
FIG. 7 shows movers with filled receptacles without and with specific control in order to reduce sloshing of a product filled in the container.

In accordance with FIG. 7 the mover 20 is provided with a receptacle holder 38, in which receptacles 36 filled with a product 35 (shown by shading) are disposed. The fill level of the product 35 is oriented horizontally in a first state a. In this first state a, a', the product 35 is still (acceleration and speed equal to zero). The mover 20 cooperating with a driving surface 13 (not shown) can rotate about a pivot point 33.

A mover 20 without control for preventing the sloshing of the product 35 is shown in the upper row of FIG. 7, and a mover 20 with control for preventing the sloshing of the product 35 in the corresponding states is shown in the row therebelow. In a second state b, b' the mover 20 accelerates the product with constant positive acceleration a. The speed v increases linearly accordingly. The product 35 at the top (state b) sloshes, and the fill level of the product 35 is inclined relative to the horizontal or is no longer oriented perpendicularly to the receptacle axis. In the case of the control, shown therebelow, of the mover (state b') for preventing the sloshing, however, the mover 20 rotates the receptacle holder 38 about the pivot point 31 by an angle $\alpha$. The angle $\alpha$ is dependent on the corresponding acceleration a (tan $\alpha$=a/g, wherein a is the acceleration of the mover 20, and g is gravity). The angle $\alpha$ describes the rotation relative to the normal position or still position. In accordance with state b', a sloshing is prevented by the rotation of the mover 20. The fill level of the product 35 remains oriented perpendicularly to the receptacle axis.

Once the acceleration phase (states b, b') has been passed through, there is then a phase with constant speed (states c, c'). In this phase the mover 20 is no longer rotated by an angle $\alpha$ ($\alpha$=0).

In a following phase (states d, d') the mover 20 is slowed with a constant negative acceleration. Without anti-slosh control (state d), the fill level is no longer oriented perpendicularly to the receptacle axis. By contrast, with anti-slosh control (state d'), the mover 20 rotates the receptacle carrier 38 as shown by an angle α (tan α=a/g), wherein a is the (negative) acceleration of the mover 20, and g is gravity). The fill level thus remains oriented perpendicularly to the receptacle axis, and sloshing is thus prevented.

Due to the use of movers 20, 21, which cooperate in the form of a planar drive with the carrier plate 12 or driving surface 13, flexible possibilities both of the receptacle transport and the movement of components of process stations are provided. The described process stations or the process stations provided depending on the application 38, 40, 43, 44, 47, 48, 49, 50, 51, 53, 54, 55, 56 can also be combined in another way in a device 8; due to the flexible transport system, facilities can also be constructed and modified as applicable in a very flexible and modular manner. Due to the substantially contactless driving system, this is suitable especially for application in filling and/or closing and/or weighing means in the pharmaceutical industry, since the requirements there in respect of particle purity are particularly high. However, other fields of application are also possible in principle.

The invention claimed is:

1. A device for filling a receptacle, comprising:
at least one filling station (48) for filling at least one receptacle (36),
at least one receptacle holder (38) for transporting the receptacle (36) relative to the filling station (48),
at least one driving surface (13),
a controller (11),
and at least one mover (20),
wherein the mover (20) is arranged on the driving surface (13) displaceably and/or rotatably in at least two degrees of freedom,
wherein the mover (20) is magnetically coupled to the driving surface (13) and, due to the magnetic coupling, contactlessly movable relative to the driving surface (13),
wherein the receptacle holder (38) is connected to the mover (20),
wherein the mover (20) transports the receptacle (36) into a filling position (148), at which the filling station (48) is arranged,
wherein at least one closing station (50) and/or at least one weighing station (56) and/or at least one inspection station (55) and/or inlet (40) and/or outlet (60) is provided and the driving surface (13) is configured such that the mover (20) moves at least the receptacle holder (38) to at least two of a closing position (150) at the closing station (50) and/or a weighing position (156) at the weighing station (56) and/or an inspection position (155) at the inspection station (55) and/or an inlet position (140) at the inlet (40) and/or an outlet position (160) at the outlet (60), and
wherein the controller (11), via the driving surface (13), causes the mover (20), once filling at the filling station (48) is complete, to electively move the at least one receptacle (36) along a changeable route, depending on a state of the receptacle (36), to at least two of the closing position (150), the weighing position (156), the inspection position (155), the inlet (140), and the outlet (160).

2. The device as claimed in claim 1, characterized in that the driving surface (13) is formed as a vertical plane.

3. The device as claimed in claim 1, characterized in that a plurality of the at least one movers (20) are provided, wherein each of the movers are movable independently of one another.

4. The device as claimed in claim 1, characterized in that the receptacle holder (38) moves during a filling process.

5. The device as claimed in claim 1, characterized in that the receptacle holder (38) moves relative to a filling needle (72) during a filling process.

6. The device as claimed in claim 1, characterized in that at least one process mover (21), which is configured to be coupled to the driving surface (13), is provided.

7. The device as claimed in claim 1, characterized in that the filling station (48) comprises at least one pre-filling station (47) and/or at least one end filling station (49), wherein the driving surface (13) is configured such that the mover (20) moves the receptacle holder (38) between the pre-filling station (47) and the end filling station (49).

8. The device as claimed in claim 1, characterized in that the mover (20) and/or the driving surface (13) comprise at least one magnetic field-generating means.

9. The device as claimed in claim 1, characterized in that the receptacle holder (38) moves away from a filling needle (72) during a filling process.

10. The device as claimed in claim 1, characterized in that at least one process mover (21), which is configured to be magnetically coupled to the driving surface (13), is provided, and
in that at least one filling needle (72) of the filling station (48) is connected to the process mover (21) in order to move the filling needle (72) by the process mover (21).

11. The device as claimed in claim 1, characterized in that the mover (20) and/or the driving surface (13) comprise a coil (18) and/or a magnet.

12. The device as claimed in claim 1,
wherein the magnetic coupling forms an air gap between the driving surface (13) and the mover (20) so that the mover (20) can move contactlessly relative to the driving surface (13).

13. The device as claimed in claim 12,
wherein coils (18) are associated with the driving surface (13),
wherein the mover (20) includes a magnet (19), which produces a magnetic field, and
wherein the magnet (19) cooperates with the coils (18), which produce a field of travelling waves, in order to produce movement.

14. The device as claimed in claim 1, wherein the controller (11), via the driving surface (13), causes the mover (20), once filling at the filling station (48) is complete, to electively move the at least one receptacle (36) along a changeable route, depending on both a state of the receptacle (36) and a state of one of the filling, closing, weighing and inspection stations, to at least two of the closing position (150), the weighing position (156), the inspection position (155), the inlet (140), and the outlet (160).

* * * * *